United States Patent
Anzai

(10) Patent No.: US 12,517,294 B2
(45) Date of Patent: Jan. 6, 2026

(54) LINEARLY POLARIZED LIGHT REFLECTION FILM, WINDSHIELD GLASS, AND HEAD-UP DISPLAY SYSTEM

(71) Applicant: FUJIFILM Corporation, Tokyo (JP)

(72) Inventor: Akihiro Anzai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 624 days.

(21) Appl. No.: 17/956,545

(22) Filed: Sep. 29, 2022

(65) Prior Publication Data

US 2023/0035433 A1   Feb. 2, 2023

Related U.S. Application Data

(63) Continuation of application No. PCT/JP2021/012859, filed on Mar. 26, 2021.

(30) Foreign Application Priority Data

| Mar. 30, 2020 | (JP) | ................................. 2020-059979 |
| Nov. 16, 2020 | (JP) | ................................. 2020-190429 |

(51) Int. Cl.
  *G02B 5/30* (2006.01)
  *B60K 35/23* (2024.01)
  (Continued)

(52) U.S. Cl.
  CPC ............ *G02B 5/3066* (2013.01); *B60K 35/23* (2024.01); *G02B 27/0101* (2013.01);
  (Continued)

(58) Field of Classification Search
  CPC .............. G02B 5/3066; G02B 27/0101; G02B 2027/0145; B60K 2360/25; B60K 35/23; B60K 2360/23; B60K 35/00
  (Continued)

(56) References Cited

U.S. PATENT DOCUMENTS

| 2015/0323717 A1 | 11/2015 | Han et al. |
| 2017/0235030 A1 | 8/2017 | Tanaka et al. |
| (Continued) | | |

FOREIGN PATENT DOCUMENTS

| CN | 104412133 A | 3/2015 |
| CN | 106415335 A | 2/2017 |
| (Continued) | | |

OTHER PUBLICATIONS

Extended European Search Report for corresponding European Application No. 21782212.1, dated Oct. 19, 2023.
(Continued)

*Primary Examiner* — Balram T Parbadia
*Assistant Examiner* — Grant A Gagnon
(74) *Attorney, Agent, or Firm* — Birch, Stewart, Kolasch & Birch, LLP

(57) ABSTRACT

There are provided a linearly polarized light reflection film that has a high visible light transmittance, is capable of increasing the brightness of a display image, and is highly transparent in terms of appearance tint, a windshield glass, and a head-up display system. The linearly polarized light reflection film has a selectively reflecting layer in which an optically anisotropic layer and an isotropic layer are laminated. The selectively reflecting layer has at least one first reflection peak having a reflection center wavelength of 430 nm or more and less than 500 nm and having a reflectivity of 10% or more and 20% or less, at least one second reflection peak having a reflection center wavelength of 530 nm or more and less than 600 nm and having a reflectivity of 10% or more and 20% or less, and a third reflection peak having a reflection center wavelength of 600 nm or more and 800 nm or less, where two or more reflection peaks are present with a reflectivity of 10% or more and 20% or less or one reflection peak is present with a reflectivity of 10%
(Continued)

or more and 20% or less and a wavelength width of 120 nm or more.

20 Claims, 3 Drawing Sheets

(51) Int. Cl.
    *G02B 27/01*     (2006.01)
    *B60K 35/233*     (2024.01)
    *B60K 35/28*     (2024.01)
    *B60K 35/60*     (2024.01)

(52) U.S. Cl.
    CPC ............ *B60K 35/233* (2024.01); *B60K 35/28* (2024.01); *B60K 35/60* (2024.01); *B60K 2360/23* (2024.01); *B60K 2360/25* (2024.01); *G02B 2027/0145* (2013.01)

(58) Field of Classification Search
    USPC ........................................................ 359/485
    See application file for complete search history.

(56) References Cited

U.S. PATENT DOCUMENTS

2018/0099614 A1     4/2018     Taguchi et al.
2020/0326539 A1     10/2020     Ando et al.

FOREIGN PATENT DOCUMENTS

| | | |
|---|---|---|
| CN | 107272105 A | 10/2017 |
| CN | 107683224 A | 2/2018 |
| JP | 2016-90928 A | 5/2016 |
| JP | 2017-7565 A | 1/2017 |
| JP | 2018-17839 A | 2/2018 |
| JP | 2019-15783 A | 1/2019 |
| WO | WO 2016/056617 A1 | 4/2016 |
| WO | WO 2019/146423 A1 | 8/2019 |

OTHER PUBLICATIONS

Japanese Office Action for corresponding Japanese Application No. 2022-512115, dated Oct. 24, 2023, with English translation.
International Preliminary Report on Patentability, dated Oct. 13, 2022, and Written Opinion of the International Searching Authority, dated May 25, 2021, for International Application No. PCT/JP2021/012859, with an English translation.
International Search Report for International Application No. PCT/JP2021/012859, dated May 25, 2021, with an English translation.
Chinese Office Action and Search Report for Chinese Application No. 202180026831.4, dated Feb. 25, 2025, with an English translation.
European Communication pursuant to Article 94(3) EPC for corresponding European Application No. 21 782 212.1, dated Aug. 28, 2025.

LINEARLY POLARIZED LIGHT REFLECTION FILM, WINDSHIELD GLASS, AND HEAD-UP DISPLAY SYSTEM

CROSS-REFERENCE TO RELATED APPLICATIONS

This application is a Continuation of PCT International Application No. PCT/JP2021/012859 filed on Mar. 26, 2021, which claims priority under 35 U.S.C. § 119(a) to Japanese Patent Application No. 2020-059979 filed on Mar. 30, 2020 and Japanese Patent Application No. 2020-190429 filed on Nov. 16, 2020. Each of the above applications is hereby expressly incorporated by reference, in its entirety, into the present application.

BACKGROUND OF THE INVENTION

1. Field of the Invention

The present invention relates to a linearly polarized light reflection film that can be used as a combiner of a head-up display system, and to a windshield glass and a head-up display system having the linearly polarized light reflection film.

2. Description of the Related Art

At present, head-up displays or head-up display systems are known that project a screen image on a windshield glass of a vehicle or the like and provide various information such as a map, a driving speed, and a vehicle state to a driver or the like.

In such a head-up display system, a driver or the like observes a virtual image of a screen image projected on the windshield glass and including the above-mentioned various information. The imaging position of the virtual image is located ahead of the windshield glass outside the vehicle. The imaging position of the virtual image is normally located 1000 mm or more ahead of the windshield glass and on the outer side of the windshield glass. Thus, the driver can obtain the above-mentioned various information without widely moving the line of sight while seeing the outside front view. Therefore, when the head-up display system is used, it is expected that driving is more safely performed while various information is obtained.

The head-up display system can be constituted by forming a linearly polarized light reflection film on the windshield glass using a half mirror film. Various half mirror films that can be used for head-up display systems have been proposed.

WO2016/056617A discloses a light reflection film which includes one or more light reflection layers among a light reflection layer PRL-1 having a reflection center wavelength of 400 nm or more and less than 500 nm and having a reflectivity of 5% or more and 25% or less for normal light at the reflection center wavelength, a light reflection layer PRL-2 having a reflection center wavelength of 500 nm or more and less than 600 nm and having a reflectivity of 5% or more and 25% or less for normal light at the reflection center wavelength, and a light reflection layer PRL-3 having a reflection center wavelength of 600 nm or more and less than 700 nm and having a reflectivity of 5% or more and 25% or less for normal light at the reflection center wavelength and in which at least two light reflection layers having different reflection center wavelengths are laminated, and the at least two light reflection layers laminated each reflect polarized light in the same direction.

The light reflection film described in WO2016/056617A is incorporated into, for example, a windshield glass to constitute a head-up display system. The windshield glass (combiner) constituting the head-up display system is required to have high visible light transmittance and to allow a driver to visually recognize a screen image even when the driver wears polarized sunglasses.

Light reflected from, for example, a hood and puddles on a road surface, which interferes with driving, is mainly s-polarized light. To address this, polarized sunglasses have a function of screening out s-polarized light. Therefore, glare caused by light reflected from the hood of cars in the opposite lane or puddles, which interferes with driving, is made invisible by wearing polarized sunglasses.

Herein, the light reflection film described in WO2016/056617A reflects p-polarized light in order to display a projection image using p-polarized light. Therefore, even when polarized sunglasses that screen out s-polarized light are worn, the screen image of the head-up display system can be visually recognized.

SUMMARY OF THE INVENTION

Herein, head-up display systems for vehicles are required to have a transmittance higher than or equal to the legal regulations and transparency in terms of appearance tint even when viewed from various angles from the viewpoint of designability.

In the related art, it has been considered to decrease the reflectivity to bring the appearance tint close to transparency while maintaining a regulated transmittance of 70% or more. However, an excessively low transmittance decreases the brightness of a display image (projection image), which deteriorates the visibility.

It is an object of the present invention to provide a linearly polarized light reflection film that has a high visible light transmittance, is capable of increasing the brightness of a display image, and is highly transparent in terms of appearance tint, and a windshield glass and a head-up display system including the linearly polarized light reflection film.

[1] A linearly polarized light reflection film has a selectively reflecting layer in which an optically anisotropic layer and an isotropic layer are laminated.

The selectively reflecting layer satisfies all of items below:
  (i) the selectively reflecting layer has at least one first reflection peak having a reflection center wavelength of 430 nm or more and less than 500 nm and has a natural light reflectivity of 10% or more and 20% or less at the first reflection peak,
  (ii) the selectively reflecting layer has at least one second reflection peak having a reflection center wavelength of 530 nm or more and less than 600 nm and has a natural light reflectivity of 10% or more and 20% or less at the second reflection peak, and
  (iii) the selectively reflecting layer has a third reflection peak having a reflection center wavelength of 600 nm or more and 800 nm or less, and the third reflection peak satisfies any of conditions below,
    (a) two or more reflection peaks are present with a natural light reflectivity of 10% or more and 20% or less, and
    (b) one reflection peak is present with a natural light reflectivity of 10% or more and 20% or less, and a region having a reflectivity higher than an average of a maximum reflectivity and a minimum reflectivity at 600 nm to 800 nm has a wavelength width of 120 nm or more.

[2] In the linearly polarized light reflection film according to [1], an intensity ratio between the first reflection peak and the second reflection peak is 80% or more and 120% or less, an intensity ratio between the first reflection peak and the third reflection peak is 80% or more and 120% or less, and an intensity ratio between the second reflection peak and the third reflection peak is 80% or more and 120% or less.

[3] In the linearly polarized light reflection film according to [1] or [2], at the first reflection peak, a region having a reflectivity higher than an average of a maximum reflectivity and a minimum reflectivity at 430 nm to 500 nm has a wavelength width of 20 nm or more and 95 nm or less, and at the second reflection peak, a region having a reflectivity higher than an average of a maximum reflectivity and a minimum reflectivity at 530 nm to 600 nm has a wavelength width of 20 nm or more and 95 nm or less.

[4] In the linearly polarized light reflection film according to any one of [1] to [3], the selectively reflecting layer is constituted by two or more light reflection layers having different selective reflection wavelengths, and light reflection layers having any of the first reflection peak, the second reflection peak, and the third reflection peak are in contact with each other.

[5] In the linearly polarized light reflection film according to any one of [1] to [4], a difference between a refractive index in a slow axis direction of the optically anisotropic layer and a refractive index of the isotropic layer is 0.03 to 0.2.

[6] In the linearly polarized light reflection film according to any one of [1] to [5], a difference between a refractive index in a slow axis direction of the optically anisotropic layer and a refractive index of the isotropic layer is 0.05 to 0.14.

[7] In the linearly polarized light reflection film according to any one of [1] to [6], a difference between a refractive index in a slow axis direction of the optically anisotropic layer and a refractive index of the isotropic layer is 0.05 to 0.10.

[8] A windshield glass has the linearly polarized light reflection film according to any one of [1] to [7] between a first glass plate and a second glass plate.

[9] A head-up display system has the windshield glass according to [8] and a projector that emits p-polarized projection image light to the windshield glass.

The present invention can provide a linearly polarized light reflection film that has a high visible light transmittance, is capable of increasing the brightness of a display image, and is highly transparent in terms of appearance tint, a windshield glass, and a head-up display system.

DESCRIPTION OF THE PREFERRED EMBODIMENTS

Figure 1:
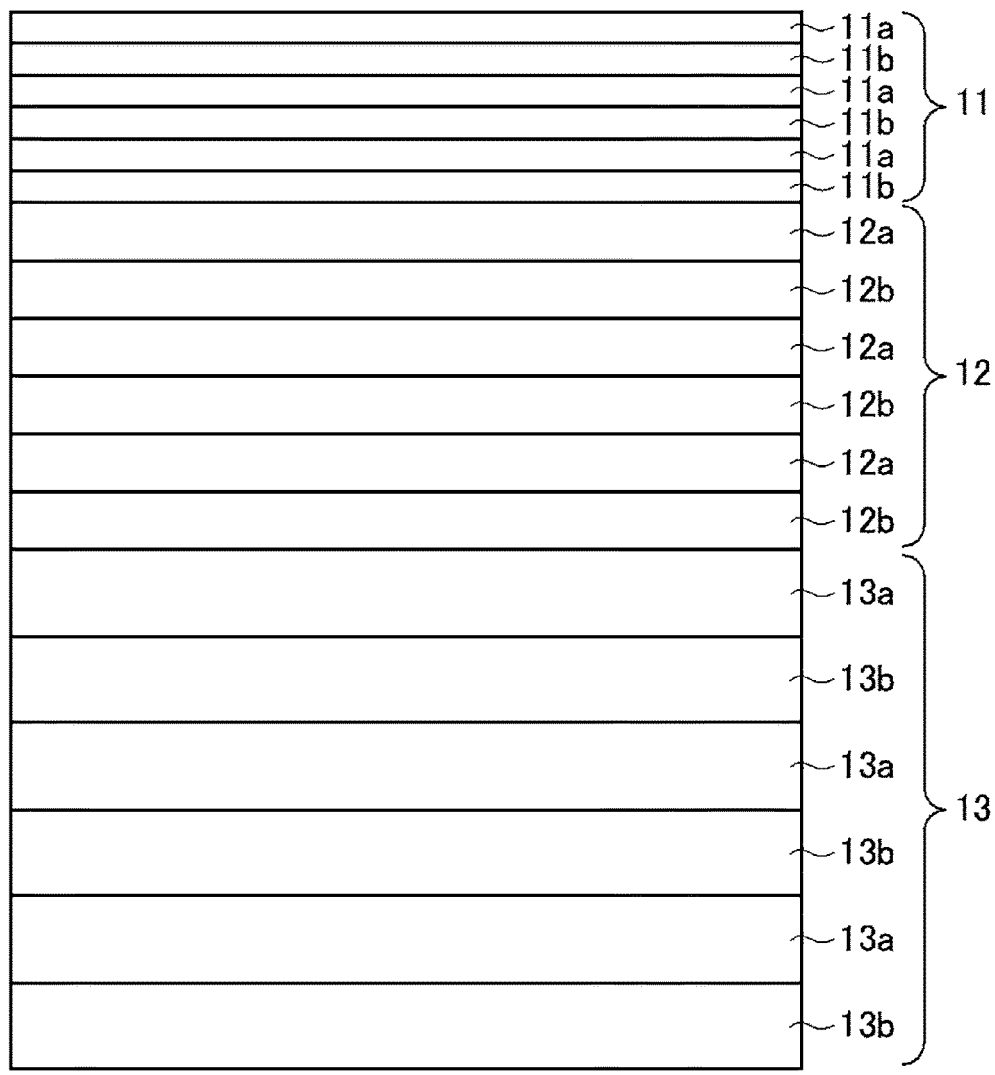
FIG. 1 is a schematic view illustrating an example of a linearly polarized light reflection film according to an embodiment of the present invention.

Hereafter, a linearly polarized light reflection film, a windshield glass, and a head-up display system according to embodiments of the present invention will be described in detail based on preferred embodiments illustrated in the attached drawings.

The drawings used for the following description are merely examples for describing the present invention, and the present invention is not limited to the drawings mentioned hereafter.

Hereafter, numerical values before and after "to" are inclusive in the numerical range. For example, when $\varepsilon_1$ is a value $\alpha_1$ to a value $\beta_1$, the range of $\varepsilon_1$ is a range including the value $\alpha_1$ and the value $\beta_1$, which is expressed by mathematical symbols as $\alpha_1 \leq \varepsilon_1 \leq \beta_1$.

The angles such as "angles expressed by specific values", "parallel", "vertical", and "orthogonal" include a margin of error generally tolerable in the corresponding technical field unless otherwise specified.

The "same" includes a margin of error generally tolerable in the corresponding technical field and, for example, the "entire surface" also includes a margin of error generally tolerable in the corresponding technical field.

The term "light" refers to light satisfying both visible light and natural light (unpolarized light) unless otherwise specified. Among electromagnetic waves, visible light is light that has wavelengths visible to the human eye and normally has wavelengths of 380 to 780 nm. Non-visible light refers to light having a wavelength range of less than 380 nm or a wavelength range of more than 780 nm.

Visible light having a wavelength range of 420 to 490 nm is blue (B) light, visible light having a wavelength range of 495 to 570 nm is green (G) light, and visible light having a wavelength range of 620 to 750 nm is red (R) light, though not limited thereto.

The term "visible light transmittance" refers to a transmittance of visible light from an A light source, which is defined in JIS (Japanese Industrial Standards) R 3212:2015 (Test methods of safety glazing materials for road vehicles). That is, the visible light transmittance is a transmittance determined by measuring the transmittance at each wavelength of 380 to 780 nm with a spectrophotometer using an A light source, multiplying the transmittance at each wavelength by the weighting function obtained from the wavelength distribution and wavelength interval of the CIE (International Commission on Illumination) photopic luminous efficiency function, and calculating a weighted average.

The "reflected light" or "transmitted light" simply mentioned includes scattered light and diffracted light.

The p-polarized light refers to polarized light that oscillates in a direction parallel to the incidence plane of light. The incidence plane is a plane that is vertical to the reflection plane (e.g., windshield glass surface) and that includes incident light and reflected light. In the p-polarized light, the oscillation plane of an electric field vector is parallel to the incidence plane.

The front retardation is measured using an AxoScan manufactured by Axometrics. The measurement wavelength is set to 550 nm unless otherwise specified. The front retardation may also be measured using a KOBRA 21ADH or a KOBRA WR (manufactured by Oji Scientific Instruments) by casting light having a wavelength in the visible wavelength range in the direction normal to the film. For the selection of the measurement wavelength, a wavelength selective filter can be manually changed or the measured value can be converted, for example, by using a program.

The term "projection image" refers to an image based on the projection of light from a projector used, but not a surrounding view such as a front view. The projection image is observed as a virtual image that emerges in an area ahead of a linearly polarized light reflection film of a windshield glass when viewed from a viewer.

The term "screen image" refers to an image displayed on a drawing device of a projector or an image drawn on, for example, an intermediate image screen by the drawing device. As opposed to the virtual image, the screen image is a real image.

Each of the screen image and the projection image may be a monochrome image, a multicolored image with two or more colors, or a full-color image.

Linearly Polarized Light Reflection Film

The linearly polarized light reflection film according to an embodiment of the present invention has a selectively reflecting layer in which an optically anisotropic layer and an isotropic layer are laminated, and the selectively reflecting layer satisfies all of items (i) to (iii) below.

(i) The selectively reflecting layer has at least one first reflection peak having a reflection center wavelength of 430 nm or more and less than 500 nm and has a natural light reflectivity of 10% or more and 20% or less at the first reflection peak.

(ii) The selectively reflecting layer has at least one second reflection peak having a reflection center wavelength of 530 nm or more and less than 600 nm and has a natural light reflectivity of 10% or more and 20% or less at the second reflection peak.

(iii) The selectively reflecting layer has a third reflection peak having a reflection center wavelength of 600 nm or more and 800 nm or less, and the third reflection peak satisfies any of conditions below.

(a) Two or more reflection peaks are present with a natural light reflectivity of 10% or more and 20% or less.

(b) One reflection peak is present with a natural light reflectivity of 10% or more and 20% or less, and a region having a reflectivity higher than an average of a maximum reflectivity and a minimum reflectivity at 600 nm to 800 nm has a wavelength width of 120 nm or more.

FIG. 1 is a schematic view illustrating an example of a linearly polarized light reflection film according to an embodiment of the present invention. As illustrated in FIG. 1, a linearly polarized light reflection film 10 has a selectively reflecting layer in which optically anisotropic layers (11a, 12a, and 13a) and isotropic layers (11b, 12b, and 13b) are alternately laminated. In the illustrated example, the linearly polarized light reflection film 10 has a first laminated portion 11 in which optically anisotropic layers 11a and isotropic layers 11b are alternately laminated, a second laminated portion 12 in which optically anisotropic layers 12a and isotropic layers 12b are alternately laminated, and a third laminated portion 13 in which optically anisotropic layers 13a and isotropic layers 13b are alternately laminated.

The first laminated portion 11, the second laminated portion 12, and the third laminated portion 13 have different thicknesses of the optically anisotropic layers and the isotropic layers. The number of laminated layers, the refractive index, and the like may also be different.

Figure 2:
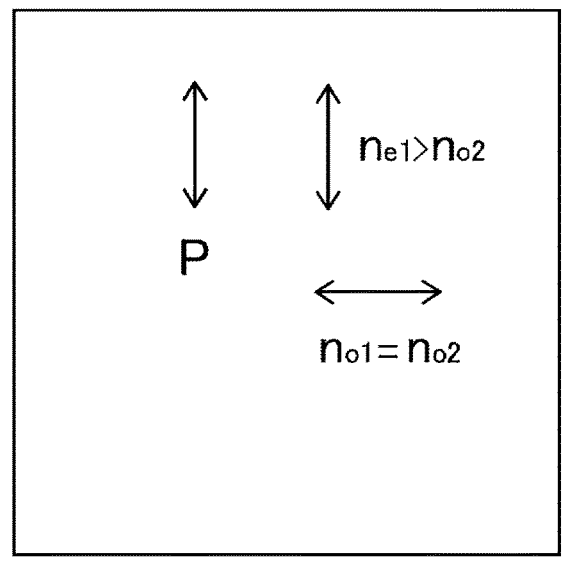
FIG. 2 is a schematic front view of the linearly polarized light reflection film in FIG. 1.

In the linearly polarized light reflection film according to an embodiment of the present invention, the refractive index $n_{e1}$ in a slow axis direction of the optically anisotropic layers is larger than the refractive index $n_{o1}$ of the isotropic layers, and the refractive index $n_{o1}$ in a direction orthogonal to the slow axis of the optically anisotropic layers is substantially the same as the refractive index $n_{o2}$ of the isotropic layers. The plurality of optically anisotropic layers are laminated so that their slow axes are parallel to each other. Therefore, as illustrated in FIG. 2, layers having a high refractive index ($n_{e1}$) and layers having a low refractive index ($n_{o2}$) are laminated in one direction (the up and down direction in FIG. 2). On the other hand, layers having the same refractive index are laminated in a direction (left and right direction in FIG. 2) orthogonal to the one direction.

Films in which layers having a low refractive index (low-refractive-index layers) and layers having a high refractive index (high-refractive-index layers) are alternately laminated are known to reflect light having a particular wavelength because of structural interference between a large number of low-refractive-index layers and a large number of high-refractive-index layers. Therefore, the linearly polarized light reflection film illustrated in FIGS. 1 and 2 reflects linearly polarized light in the up and down direction in FIG. 2 and transmits linearly polarized light in the left and right direction in FIG. 2.

Herein, the reflection spectrum of the linearly polarized light reflection film according to an embodiment of the present invention satisfies the above items (i) to (iii).

In the selectively reflecting layer in which low-refractive-index layers and high-refractive-index layers are laminated, the reflection wavelength and the reflectivity can be controlled by, for example, the difference in refractive index between the low-refractive-index layers and the high-refractive-index layers, the thickness, and the number of laminated layers. In the example illustrated in FIG. 1, mainly, the first laminated portion 11 achieves reflection that satisfies the item (i), the second laminated portion 12 achieves reflection that satisfies the item (ii), and the third laminated portion 13 achieves reflection that satisfies the item (iii).

Figure 3:
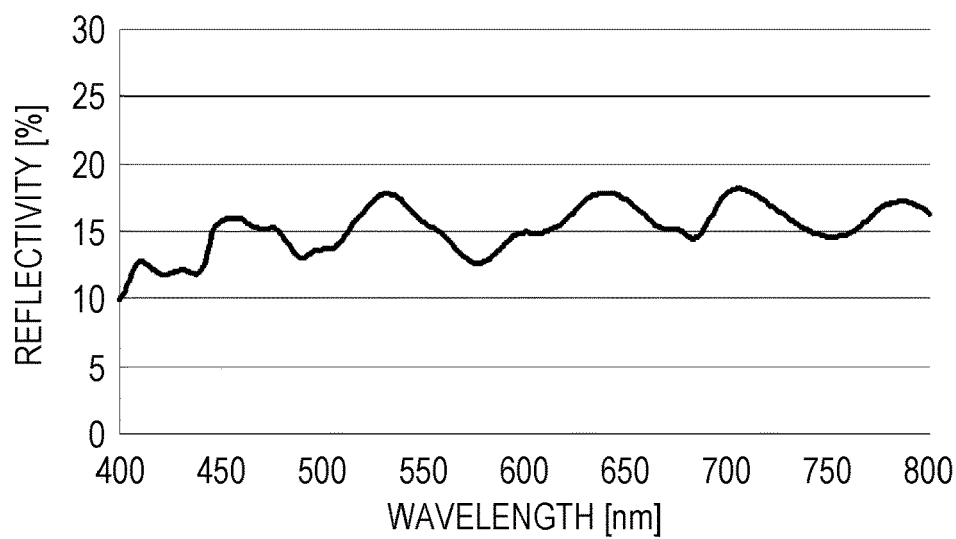
FIG. 3 is a graph illustrating the relationship between wavelength and transmittance.
Figure 4:
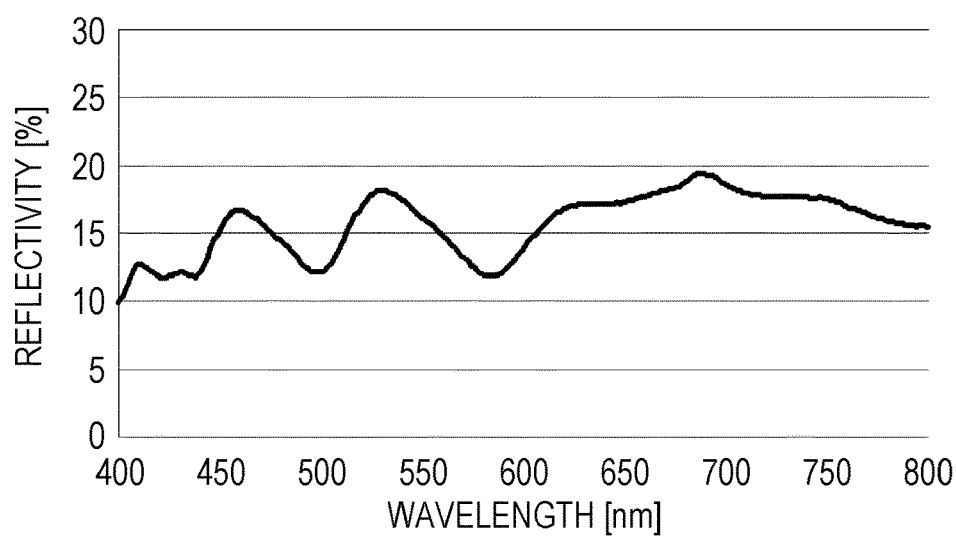
FIG. 4 is a graph illustrating the relationship between wavelength and transmittance.

FIGS. 3 and 4 illustrate examples of natural light reflection spectra that satisfy the above items (i) to (iii).

The spectrum illustrated in the graph of FIG. 3 has a first reflection peak near a wavelength of 450 nm. The natural light reflectivity of the first reflection peak is 10% or more and 20% or less, which satisfies the item (i).

The spectrum illustrated in the graph of FIG. 3 has a second reflection peak near a wavelength of 530 nm. The natural light reflectivity of the second reflection peak is 10% or more and 20% or less, which satisfies the item (ii).

The spectrum illustrated in the graph of FIG. 3 has two third reflection peaks near wavelengths of 640 nm and 700 nm. The natural light reflectivities of the third reflection peaks are each 10% or more and 20% or less, which satisfies (a) in the item (iii).

On the other hand, the spectrum illustrated in the graph of FIG. 4 has a first reflection peak near a wavelength of 460 nm. The natural light reflectivity of the first reflection peak is 10% or more and 20% or less, which satisfies the item (i).

The spectrum illustrated in the graph of FIG. 4 has a second reflection peak near a wavelength of 530 nm. The natural light reflectivity of the second reflection peak is 10% or more and 20% or less, which satisfies the item (ii).

The spectrum illustrated in the graph of FIG. 4 has a third reflection peak near a wavelength of 690 nm. For the third reflection peak, the average of the maximum reflectivity and the minimum reflectivity in the wavelength range of 600 nm to 800 nm is 16.6%, and the wavelength width of a region having a reflectivity higher than the average is 150 nm, which satisfies (b) in the item (iii).

In the present invention, the reflection peak refers to a peak having a maximum value with a difference of 2% or more from an adjacent minimum value and having a half-width of 10 to 200 nm.

As described above, head-up display systems for vehicles are required to have a transmittance higher than or equal to the legal regulations and transparency in terms of appearance tint even when viewed from various angles from the viewpoint of designability. In the related art, it has been considered to decrease the reflectivity to bring the appearance tint close to transparency (white) while maintaining a regulated transmittance of 70% or more. However, an excessively low reflectivity decreases the brightness of a display image (projection image), which deteriorates the visibility.

In contrast, the linearly polarized light reflection film according to an embodiment of the present invention has a second reflection peak with a reflectivity of 10% to 20% at wavelengths of 530 nm or more and less than 600 nm, which can improve the transparency of the tint. In order to achieve a regulated front transmittance of 70%, the reflectivity near 550 nm of luminosity is important. Therefore, when the reflectivity of the second reflection peak is set to 20% or less, the transmittance can be achieved. To increase the brightness, the reflectivity near 550 nm in an oblique direction (incidence angle 60°) needs to be high. The linearly polarized light reflection film according to an embodiment of the present invention has a third reflection peak having a reflectivity of 10% to 20% at wavelengths of 600 nm or more and 800 nm or less, and the third reflection peak has two reflection peaks or the width of the reflection range is 120 nm or more. Therefore, the front brightness of a display image can be improved and the transparency of the tint viewed in an oblique direction (incidence angle) 60° can be improved. When only the second reflection peak and the third reflection peak are present, the front reflection tint results in yellow to red. Therefore, when the linearly polarized light reflection film according to an embodiment of the present invention has a first reflection peak with a reflectivity of 10% to 20% at wavelengths of 430 nm or more and less than 500 nm, the transparency of the tint viewed from near the front (incidence angle 5°) can be improved. Furthermore, by setting the above three reflection peaks, wavelength ranges with low reflectivity are formed between the first reflection peak and the second reflection peak and between the second reflection peak and the third reflection peak, which improves the transmittance.

These effects can bring the natural light transmittance of a windshield glass obtained by sandwiching the linearly polarized light reflection film between green glasses to 70% or more (80% or more when sandwiched between clear glasses). The p-polarized light reflectivity can be set to 25% or more, which can improve the brightness of a display image. Furthermore, the transparency of the tint viewed in various directions can be improved.

As described above, the wavelength at which the selectively reflecting layer reflects light and the reflectivity can be controlled by, for example, the difference in refractive index between the low-refractive-index layers and the high-refractive-index layers, the thickness, and the number of laminated layers. Specifically, the wavelength $\lambda$ of light to be reflected can be controlled by setting the thicknesses d of the low-refractive-index layers and the high-refractive-index layers so as to satisfy $d=\lambda/(4 \times n)$, where n represents a refractive index. Since the reflectivity increases as the number of laminated low-refractive-index layers and high-refractive-index layers increases, the reflectivity can be controlled by adjusting the number of laminated layers. The width of the reflection range can be controlled by the difference in refractive index between the low-refractive-index layers and the high-refractive-index layers.

Herein, from the viewpoint of improving the appearance tint, the intensity ratio (reflectivity ratio) between the first reflection peak and the second reflection peak is preferably 80% or more and 120% or less, the intensity ratio between the first reflection peak and the third reflection peak is preferably 80% or more and 120% or less, and the intensity ratio between the second reflection peak and the third reflection peak is preferably 80% or more and 120% or less. When the reflectivities at the reflection peaks are close to each other, the appearance tint is brought to be whitish, which can improve the transparency.

Herein, the wavelength width of each reflection peak is dependent on the difference between the refractive index in the slow axis direction of the optically anisotropic layers and the refractive index of the isotropic layers. The wavelength width increases as the difference in refractive index increases. When reflection peaks having low reflectivities are present at close wavelengths, interference occurs, which results in an excessively strong reflection peak or an excessively weak reflection peak. The difference between the refractive index in the slow axis direction of the optically anisotropic layers and the refractive index of the isotropic layers is preferably 0.03 to 0.2, more preferably 0.05 to 0.14, and further preferably 0.05 to 0.10 from the viewpoint of appropriately adjusting the wavelength width of each reflection peak to increase the transmittance while improving the brightness of a display image, and from the viewpoint of reducing the influence of the interference between adjacent reflection peaks.

In the first reflection peak, the wavelength width of a region having a reflectivity higher than the average of the maximum reflectivity and the minimum reflectivity at 430 nm to 500 nm is preferably 20 nm or more and 95 nm or less, more preferably 25 nm or more and 85 nm or less, and further preferably 30 nm or more and 80 nm or less.

Similarly, in the second reflection peak, the wavelength width of a region having a reflectivity higher than the average of the maximum reflectivity and the minimum reflectivity at 530 nm to 600 nm is preferably 20 nm or more and 95 nm or less, more preferably 25 nm or more and 85 nm or less, and further preferably 30 nm or more and 80 nm or less.

When the wavelength width of the first reflection peak and the wavelength width of the second reflection peak are each 20 nm or more and 95 nm or less, that is, when the wavelength widths of the first reflection peak and the second reflection peak are narrow, the transmittance can be increased while the front brightness of a display image is improved.

In the examples illustrated in FIGS. 3 and 4, one first reflection peak and one second reflection peak are present, but two or more first reflection peaks and two or more second reflection peaks may be present.

Preferably, the selectively reflecting layer is constituted by two or more light reflection layers having different selective reflection wavelengths, and the light reflection layers having any of the first reflection peak, the second reflection peak, and the third reflection peak are in contact with each other. For example, in the example illustrated in FIG. 1, the first laminated portion 11 that selectively reflects light having a wavelength of the first reflection peak and the second laminated portion 12 that selectively reflects light having a wavelength of the second reflection peak are in contact with each other. The second laminated portion 12 that selectively reflects light having a wavelength of the second reflection peak and the third laminated portion 13 that selectively reflects light having a wavelength of the third reflection peak are in contact with each other. The first laminated portion 11, the second laminated portion 12, and the third laminated portion 13 are light reflection layers according to an embodiment of the present invention.

When the light reflection layers having any of the reflection peaks are away from each other, the thickness between the layers increases, which makes it difficult to obtain the effect of interference of light reflected by each light reflection layer. In contrast, when the light reflection layers are in contact with each other, the wavelength width of each reflection peak can be narrowed because of the effect of interference of light reflected by each light reflection layer.

The linearly polarized light reflection film may be, for example, a thin film or a sheet-shaped film. The linearly polarized light reflection film may be, for example, a rolled thin film before used for a windshield glass.

The material for the selectively reflecting layer and the method for producing the selectively reflecting layer may be, for example, those described in JP1997-506837A (JP-H9-506837A). Specifically, when processing is performed under conditions selected to obtain the refractive index relation, various materials may be employed to form the selectively reflecting layer. In general, a first material needs to have, in a selected direction, a refractive index different from that of a second material. This difference in refractive index can be provided by various methods such as stretching during or after formation of a film, extrusion forming, or coating. In addition, the two materials preferably have similar rheological characteristics (for example, melt viscosity) so as to be extruded simultaneously.

Examples of materials particularly suitably used for the selectively reflecting layer include PEN (polyethylene naphthalate) and PET (polyethylene terephthalate) for the optically anisotropic layer and (isotropically adjusted) PEN and PET, and PMMA (polymethyl methacrylate) for the isotropic layer.

As described above, the linearly polarized light reflection film (selectively reflecting layer) according to an embodiment of the present invention has three laminated portions in which the thicknesses of the optically anisotropic layers and the isotropic layers are different from each other so as to provide a configuration having the first reflection peak, the second reflection peak, and the third reflection peak. In the present invention, it is sufficient that three laminated portions are formed by the above-described stretching, extrusion forming, or the like and then bonded to each other to produce a linearly polarized light reflection film. Alternatively, the three laminated portions may be integrally formed through stretching, extrusion forming, or the like by adjusting the thickness before processing so that three laminated portions having different thicknesses are formed.

It is sufficient that the thickness of the selectively reflecting layer is preferably in the range of 2.0 to 50 μm and more preferably in the range of 8.0 to 30 μm.

The linearly polarized light reflection film has a selectively reflecting layer. The linearly polarized light reflection film may include, in addition to the selectively reflecting layer, a retardation layer, a polarization converting layer, a support, and an adhesive layer.

The support, the adhesive layer, and the like are each preferably transparent in the visible light range.

The support, the adhesive layer, and the like each preferably have low birefringence. The low birefringence means that the front retardation is 10 nm or less in a wavelength range in which the linearly polarized light reflection film of the windshield glass according to an embodiment of the present invention exhibits reflection. The front retardation is preferably 5 nm or less. Furthermore, the difference between the refractive indices of the support, the adhesive layer, and the like and the average refractive index (in-plane average refractive index) of the selectively reflecting layer is preferably small.

Support

The support can also be used as a substrate for forming the selectively reflecting layer. The support used for forming the selectively reflecting layer may be a temporary support that is peeled off after formation of the selectively reflecting layer. Therefore, the completed linearly polarized light reflection film and windshield glass do not necessarily include a support. Instead of peeling off the temporary support, when the completed linearly polarized light reflection film or windshield glass includes a support, the support is preferably transparent in the visible light range.

The material for the support is not limited. The support is a plastic film of, for example, polyester such as polyethylene terephthalate (PET), polycarbonate, acrylic resin, epoxy resin, polyurethane, polyamide, polyolefin, cellulose derivatives, or silicone. The temporary support may be formed of glass instead of the above plastic film.

The thickness of the support may be about 5.0 to 1000 μm, and is preferably 10 to 250 μm and more preferably 15 to 90 μm.

Hereafter, a windshield glass having the linearly polarized light reflection film according to an embodiment of the present invention and a head-up display (HUD) will be described.

Windshield Glass

A windshield glass having a projection image display function can be provided by using the linearly polarized light reflection film according to an embodiment of the present invention.

The windshield glass refers to a window pane and a windscreen of common vehicles such as cars, trains, airplanes, ships, two-wheeled vehicles, and rides. The windshield glass is preferably used as, for example, a windshield and a windscreen present at the front in a direction in which the vehicle travels.

The visible light transmittance of the windshield glass is not limited, but is preferably as high as possible. The visible light transmittance of the windshield glass is preferably 70% or more, more preferably more than 70%, further preferably 75% or more, and particularly preferably 80% or more.

The above visible light transmittance is preferably satisfied at any position of the windshield glass, and is particularly preferably satisfied at a position where the linearly polarized light reflection film is present. The linearly polarized light reflection film according to an embodiment of the present invention has high visible light transmittance as described above. Therefore, even when the windshield glass is any typically used glass, the above visible light transmittance can be satisfied.

The shape of the windshield glass is not limited, and is appropriately determined in accordance with the object on which the windshield glass is disposed. For example, the windshield glass may have a flat shape or a three-dimensional shape having a curved surface such as a concave surface or a convex surface. In a windshield glass molded for vehicles for use, the top of the windshield glass during normal operation and the surface on the visual side such as the observer side, the driver side, and the inside of a car can be identified.

The windshield glass may have a uniform thickness or a nonuniform thickness in a portion in which the linearly polarized light reflection film is disposed. For example, as in a glass for vehicles described in JP2011-505330A, the windshield glass may have a wedge-shaped section and may include a linearly polarized light reflection film having a nonuniform thickness, but preferably includes a linearly polarized light reflection film having a uniform thickness in a portion in which the linearly polarized light reflection film is disposed.

In the windshield glass, it is sufficient that the linearly polarized light reflection film is disposed in a projection image-displaying section (projection image-reflecting section) of the windshield glass.

By disposing the linearly polarized light reflection film according to an embodiment of the present invention on an outer surface of a glass plate of the windshield glass or between glasses of the windshield glass having a configuration of laminated glass described later, a head-up display (hereafter also referred to as an HUD) using the windshield glass can be provided.

When the linearly polarized light reflection film according to an embodiment of the present invention is disposed on an outer surface of a glass plate of the windshield glass, the linearly polarized light reflection film may be disposed inside (on the incidence side of a projection image) or outside a vehicle or the like, but is preferably disposed inside a vehicle or the like.

The linearly polarized light reflection film according to an embodiment of the present invention has lower scratch resistance than the glass plate. Therefore, when the windshield glass has a laminated glass structure, the linearly polarized light reflection film is more preferably disposed between two glasses constituting the laminated glass in order to protect the linearly polarized light reflection film.

As described above, the linearly polarized light reflection film is a member for displaying a projection image by reflecting the projection image. Therefore, it is sufficient that the linearly polarized light reflection film is disposed at a position at which a projection image projected from a projector or the like can be displayed in a visible manner.

That is, the linearly polarized light reflection film according to an embodiment of the present invention functions as a combiner of the HUD. In the HUD, the combiner refers to an optical member that can display, in a visible manner, a screen image projected from a projector while allows simultaneous observation of information, such as a view, on the side opposite to the incidence surface of projection light when the combiner is observed from the incidence side of the projection image. That is, the combiner has a function as an optical path combiner that performs display through superposition of external light and light of the projection image.

The linearly polarized light reflection film may be disposed on the whole surface of the windshield glass or on part of the windshield glass in an in-plane direction, but is preferably disposed on part of the windshield glass.

When the linearly polarized light reflection film is disposed on part of the windshield glass, the linearly polarized light reflection film may be disposed at any position of the windshield glass, but is preferably disposed so that a virtual image is displayed at a position at which an observer such as a driver readily makes a visual identification during operation of the HUD. For example, the position at which the linearly polarized light reflection film is disposed on the windshield glass may be determined from the relationship between the position of a driver's seat in a vehicle on which the HUD is mounted and the position at which the projector is disposed.

The linearly polarized light reflection film may have a flat shape without a curved surface or may have a curved surface. The linearly polarized light reflection film may have a concave or convex shape as a whole so as to display a projection image in an enlarged or reduced manner.

Laminated Glass

The windshield glass may have a configuration of laminated glass. The windshield glass according to an embodiment of the present invention is a laminated glass and has the above-described linearly polarized light reflection film according to an embodiment of the present invention between a first glass plate and a second glass plate.

The windshield glass may have a configuration in which a linearly polarized light reflection film is disposed between the first glass plate and the second glass plate. However, the windshield glass preferably has a configuration in which an intermediate film (intermediate film sheet) is disposed between the first glass plate and the linearly polarized light reflection film and/or between the linearly polarized light reflection film and the second glass plate.

In the windshield glass, for example, the first glass plate is disposed on the side (the outer side of the vehicle) opposite to the visual side of a screen image in the HUD, and the second glass plate is disposed on the visual side (the inner side of the vehicle). In the windshield glass according to an embodiment of the present invention, the terms "first" and "second" in the first glass plate and the second glass plate have no technical meaning and are provided for convenience in order to distinguish the two glass plates. Therefore, the first glass plate may be disposed on the inner side of the vehicle and the second glass plate may be disposed on the outer side of the vehicle.

The glass plate such as the first glass plate or the second glass plate may be a glass plate typically used for windshield glasses. For example, a glass plate having a visible light transmittance of 80% or less, for example, 73% or 76%, such as a green glass having good heat-shielding properties may be used. Even when such a glass plate having a low visible light transmittance is used, a windshield glass having a visible light transmittance of 70% or more even at a position of the linearly polarized light reflection film can be produced by using the linearly polarized light reflection film according to an embodiment of the present invention.

The thickness of the glass plate is not particularly limited, and may be about 0.5 to 5.0 mm and is preferably 1.0 to 3.0 mm and more preferably 2.0 to 2.3 mm. The materials and thicknesses of the first glass plate and the second glass plate may be the same or different.

The windshield glass having a configuration of laminated glass can be produced by a publicly known method for producing a laminated glass.

In general, the windshield glass can be produced by sandwiching an intermediate film for laminated glass between two glass plates, then repeatedly performing heat treatment and pressure treatment (e.g., treatment using a rubber roller) several times, and finally performing heat treatment under pressure conditions using an autoclave or the like.

For example, the windshield glass having a configuration of a laminated glass having a linearly polarized light reflection film and an intermediate film may be produced by forming a linearly polarized light reflection film on a surface of a glass plate and then performing the above-described method for producing a laminated glass or may be produced by the above-described method for producing a laminated glass using an intermediate film for a laminated glass including the above-described linearly polarized light reflection film.

When the linearly polarized light reflection film is formed on a surface of a glass plate, the glass plate on which the linearly polarized light reflection film is to be disposed may be the first glass plate or the second glass plate. At this time, the linearly polarized light reflection film is bonded to the glass plate using, for example, an adhesive agent.

Intermediate Film

The intermediate film (intermediate film sheet) may be any publicly known intermediate film used as an intermediate film (intermediate layer) in laminated glasses. The intermediate film may be, for example, a resin film including a resin selected from the group consisting of polyvinyl butyral (PVB), ethylene-vinyl acetate copolymers, and chlorine-containing resins. The above resin is preferably a main component of the intermediate film. The main component refers to a component having a content of 50 mass % or more in the intermediate film.

Among the above resins, polyvinyl butyral and an ethylene-vinyl acetate copolymer are preferably used, and polyvinyl butyral is more preferably used. The resin is preferably a synthetic resin.

The polyvinyl butyral can be obtained by acetalizing polyvinyl alcohol with butyraldehyde. The lower limit of the degree of acetalization of polyvinyl butyral is preferably 40% and more preferably 60%. The upper limit of the degree of acetalization of polyvinyl butyral is preferably 85% and more preferably 75%.

The polyvinyl alcohol is normally obtained by saponifying polyvinyl acetate, and a polyvinyl alcohol having a degree of saponification of 80 to 99.8 mol % is generally used.

The lower limit of the degree of polymerization of the polyvinyl alcohol is preferably 200 and the upper limit of the degree of polymerization is preferably 3000. When the degree of polymerization of the polyvinyl alcohol is 200 or more, the penetration resistance of a laminated glass to be obtained does not readily deteriorate. When the degree of polymerization is 3000 or less, good moldability of a resin film is achieved and the stiffness of the resin film does not excessively increase, which provides good workability. The lower limit of the degree of polymerization is more preferably 500, and the upper limit of the degree of polymerization is more preferably 2000.

Intermediate Film Including Linearly Polarized Light Reflection Film

An intermediate film for a laminated glass including a linearly polarized light reflection film can be formed by bonding a linearly polarized light reflection film to a surface of the above-described intermediate film. Alternatively, the intermediate film for a laminated glass including a linearly polarized light reflection film can be formed by sandwiching a linearly polarized light reflection film between two of the above-described intermediate films. The two intermediate films may be the same or different, but are preferably the same.

The linearly polarized light reflection film and the intermediate films can be bonded to each other by a publicly known bonding method, and laminate treatment is preferably employed. The laminate treatment is preferably performed under certain heating and pressure conditions to prevent the separation between the laminated body and the intermediate films after the treatment.

To stably perform the laminate treatment, the film surface temperature of the intermediate film on the side to which the intermediate film is bonded is preferably 50 to 130° C. and more preferably 70 to 100° C.

Pressure is preferably applied during the laminate treatment. The pressure conditions are not limited, and are preferably less than 2.0 kg/cm$^2$ (less than 196 kPa), more preferably 0.5 to 1.8 kg/cm$^2$ (49 to 176 kPa), and further preferably 0.5 to 1.5 kg/cm$^2$ (49 to 147 kPa).

In the case where the linearly polarized light reflection film has a support, the support may be peeled off during the laminate treatment, immediately after the laminate treatment, or immediately before the laminate treatment. That is, the linearly polarized light reflection film bonded to the intermediate film obtained after the laminate treatment does not necessarily include a support.

For example, a method for producing an intermediate film including a linearly polarized light reflection film includes:

(1) a first step of bonding a linearly polarized light reflection film to a surface of a first intermediate film to obtain a first laminated body, and (2) a second step of bonding a second intermediate film to a surface of the linearly polarized light reflection film in the first laminated body, the surface being opposite to the surface to which the first intermediate film is bonded.

For example, in the first step, the linearly polarized light reflection film and the first intermediate film are bonded to each other while the support and the first intermediate film do not face each other. Subsequently, the support is peeled off from the linearly polarized light reflection film. In the second step, a second intermediate film is bonded to the surface from which the support has been peeled off. Thus, an intermediate film including a linearly polarized light reflection film having no support can be produced. By using the intermediate film including a linearly polarized light reflection film, a laminated glass in which the linearly polarized light reflection film has no support can be easily produced.

To stably peel off the support without damage or the like, the temperature of the support at which the support is peeled off from the linearly polarized light reflection film is preferably 40° C. or higher and more preferably 40 to 60° C.

HUD (Head-Up Display System)

The windshield glass can be used as a constituent member of the HUD. The HUD preferably includes a projector.

Projector

The "projector" is an "apparatus that projects light or a screen image", includes a "device that projects a drawn screen image", and emits projection light that carries a screen image to be displayed. In the HUD according to an embodiment of the present invention, the projector emits p-polarized projection light.

In the HUD, it is sufficient that the projector is disposed so that p-polarized projection light that carries a screen image to be displayed is allowed to enter the linearly polarized light reflection film in the windshield glass at an oblique incidence angle.

In the HUD, the projector preferably includes a drawing device and preferably displays, as a virtual image by reflection, a screen image (real image) drawn on a small intermediate image screen using a combiner.

The projector may be a publicly known projector used for HUDs as long as the projector can emit p-polarized projection light. The projector is preferably a projector in which the imaging distance of the virtual image, that is, the imaging position of the virtual image is changeable.

Examples of the method for changing the imaging distance of a virtual image in a projector include a method in which a surface (screen) on which a screen image is generated is moved (refer to JP2017-21302A), a method in which a plurality of optical paths having different optical path lengths are changed (refer to WO2015/190157A), a method in which the optical path length is changed by inserting and/or moving mirrors, a method in which the focal length is changed by using a compound lens as an imaging lens, a method in which a projector 22 is moved, a method in which a plurality of projectors having different imaging distances of virtual images are changed and used, and a method in which a variable-focal-length lens is used (refer to WO2010/116912A).

The projector may be a projector in which the imaging distance of a virtual image is continuously changeable or a projector in which the imaging distance of a virtual image can be changed at two or more points.

Herein, the imaging distances of at least two virtual images among virtual images of projection light from the projector are preferably different from each other by 1 m or more. Therefore, when the imaging distance of a virtual image can be continuously changed in the projector, the imaging distance of a virtual image is preferably changeable by 1 m or more. Such a projector is preferably used because the projector can appropriately handle the case where the distance of line of sight of a driver is considerably different between driving at a normal speed on the general road and driving at a high speed on the expressway.

Drawing Device

The drawing device may be a device that displays a screen image by itself or may be a device that emits light capable of drawing a screen image.

In the drawing device, it is sufficient that light from a light source is controlled by a drawing method such as use of a light modulator, laser intensity modulation means, or optical deflection means for drawing. The drawing device refers to a device that includes a light source and further includes, for example, a light modulator, laser intensity modulation means, or optical deflection means for drawing in accordance with the drawing method.

Light Source

The light source is not limited, and may be a publicly known light source used in projectors, drawing devices, displays, and the like, such as a light emitting diode (LED), an organic light emitting diode (OLED), a discharge tube, or a laser light source.

Among them, an LED and a discharge tube are preferred because they are suitable for a light source of a drawing device that emits linearly polarized light. In particular, an LED is preferred. Since the emission wavelength of LEDs is not continuous in the visible light range, LEDs are suitable for combination with a combiner in which a cholesteric liquid crystal layer that exhibits selective reflection in a particular wavelength range as described later is used.

Drawing Method

The drawing method is not particularly limited, and can be selected in accordance with the light source used or the like.

Examples of the drawing method include use of a vacuum fluorescent display, an LCD (liquid crystal display) method that uses liquid crystal, an LCOS (liquid crystal on silicon) method, a DLP (registered trademark) (digital light processing) method, and a scanning method that uses laser. The drawing method may be use of a vacuum fluorescent display integrated with a light source. The drawing method is preferably an LCD method.

In the LCD method and the LCOS method, light beams of different colors are modulated and multiplexed in a light modulator, and light is emitted from a projection lens.

The DLP method is employed in a displaying system that uses a DMD (digital micromirror device). Drawing is performed while micromirrors corresponding to pixels are arranged, and light is emitted from a projection lens.

The scanning method is a method in which a screen is scanned with light beams and imaging is performed by using an afterimage effect of eyes (refer to, for example, the descriptions in JP1995-270711A (JP-H07-270711A) and JP2013-228674A). In the scanning method that uses laser, laser beams of different colors (e.g., red beam, green beam, and blue beam) subjected to intensity modulation are bundled into a single light beam with, for example, a multiplexing optical system or a condensing lens. Scanning with the light beam is performed by optical deflection means to perform drawing on an intermediate image screen described later.

In the scanning method, the intensity modulation of laser beams of different colors (e.g., red beam, green beam, and blue beam) may be directly performed by changing the intensity of a light source or may be performed using an external modulator. The optical deflection means is, for example, a galvanometer mirror, a combination of a galvanometer mirror and a polygon mirror, and a MEMS (micro-electro-mechanical system) and is preferably a MEMS. The scanning method is, for example, a random scanning method or a raster scanning method and is preferably a raster scanning method. In the raster scanning method, for example, the laser beam can be moved in a horizontal direction using a resonance frequency and in a vertical direction using a saw-tooth wave. Since the scanning method does not require a projection lens, the size of the device is easily reduced.

The light emitted from the drawing device may be linearly polarized light or natural light (unpolarized light).

In the drawing device that uses an LCD or LCOS method as the drawing method and the drawing device that uses a laser light source, the emitted light is essentially linearly polarized light. In the case where the light emitted from the drawing device is linearly polarized light and contains light beams having plural wavelengths (colors), the polarization directions (transmission axis directions) of the light beams having plural wavelengths are preferably the same. It has been known that some commercially available drawing devices have varying polarization directions in the wavelength ranges of emitted red, green, and blue light beams (refer to JP2000-221449A). Specifically, it has been known as an example that the polarization direction of green beams is orthogonal to the polarization direction of red beams and the polarization direction of blue beams.

In the HUD according to an embodiment of the present invention, the projection light emitted from the projector is p-polarized light as described above.

Intermediate Image Screen

As described above, the drawing device may be a device that uses an intermediate image screen. The "intermediate image screen" is a screen on which a screen image is drawn. That is, for example, when light emitted from the drawing device is not yet visible as a screen image, the drawing device forms a visible screen image on the intermediate image screen from the light. The screen image drawn on the intermediate image screen may be projected on the combiner using light that passes through the intermediate image screen or using light reflected by the intermediate image screen.

Examples of the intermediate image screen include scattering films, microlens arrays, and rear-projection screens. For example, in the case where the intermediate image screen is made of a plastic material, if the intermediate image screen exhibits birefringence, the polarization plane and light intensity of polarized light that enters the intermediate image screen are disturbed, which easily causes color unevenness or the like in the combiner (linearly polarized light reflection film). However, the color unevenness can be suppressed by using a retardation film having a particular phase difference.

The intermediate image screen preferably has a function of transmitting incident light beams while diverging the incident light beams. This is because the projection image can be displayed in an enlarged view. Such an intermediate image screen is, for example, a screen constituted by a microlens array. The microlens array used in an HUD is described in, for example, JP2012-226303A, JP2010-145745A, and JP2007-523369A.

The projector may include, for example, a reflecting mirror that adjusts the optical path of projection light formed by the drawing device.

For HUDs in which a windshield glass is used as a linearly polarized light reflection film, refer to, for example, JP1990-141720A (JP-H02-141720A), JP1998-96874A (JP-H10-96874A), JP2003-98470A, U.S. Pat. No. 5,013,134A, and JP2006-512622A.

The windshield glass is particularly useful for HUDs used in combination with a projector including, as a light source, a laser having a discrete emission wavelength in the visible light range, an LED, an OLED (organic light-emitting diode), or the like. This is because the selective reflection center wavelength of the cholesteric liquid crystal layer can be controlled in accordance with each emission wavelength. The windshield glass can also be used for projection of a display such as an LCD (liquid crystal display) whose light for display is polarized.

Projection Light (Incident Light)

The incident light is preferably caused to enter the linearly polarized light reflection film at an oblique incidence angle of 45° to 70° with respect to the normal of the linearly polarized light reflection film. The Brewster's angle at an interface between a glass having a refractive index of about 1.51 and air having a refractive index of 1 is about 56°. When p-polarized light is caused to enter the linearly polarized light reflection film in the above-described angle range, only a small amount of incident light for displaying a projection image is reflected by the surface of the windshield glass on the visual side relative to the selectively reflecting layer, which allows display of a screen image that is less susceptible to double images.

The above angle is also preferably 50° to 65°. Herein, it is sufficient that the projection image can be observed on the incidence side of projection light at an angle of 45° to 70°, preferably 50° to 65°, symmetrically with respect to the normal of the selectively reflecting layer.

The incident light may enter the windshield glass in any direction, that is, from the top, bottom, left, and right of the windshield glass, and it is sufficient that the direction is determined in accordance with the visual direction. For example, the incident light preferably enters the windshield glass at the above-described oblique incidence angle from the bottom during operation.

It is sufficient that the linearly polarized light reflection film of the windshield glass is disposed so as to reflect incident p-polarized light.

As described above, projection light used when a projection image is displayed on the HUD according to an embodiment of the present invention is p-polarized light that oscillates in a direction parallel to the incidence plane.

When light emitted from the projector is not linearly polarized light, the light may be converted into p-polarized light by disposing a linearly polarizing film (polarizer) on the side through which light is emitted from the projector or by a publicly known method that uses, for example, a linearly polarizing film in an optical path from the projector to the windshield glass. In this case, a member that converts projection light that is not linearly polarized light into p-polarized light is also regarded as a member constituting the projector in the HUD according to an embodiment of the present invention.

As described above, in the projector in which the polarization direction varies in the wavelength ranges of red, green, and blue light beams emitted, the incident light is preferably p-polarized light in the wavelength ranges of all colors by wavelength-selectively controlling the polarization direction.

As described above, the HUD (projector) may be a projection system in which the imaging position of a virtual image is changeable. When the imaging position of a virtual image is changeable, a driver can visually recognize the virtual image with more comfort and convenience.

The imaging position of a virtual image is a position at which a driver of a vehicle can visually recognize the virtual image, such as a position 1000 mm or more ahead of the windshield glass from the driver.

Herein, if the glass is nonuniform (wedge shape) in the linearly polarized light reflection film as described in JP2011-505330A, the angle of the wedge shape needs to be changed when the imaging position of a virtual image is changed. Therefore, as described in, for example, JP2017-15902A, the angle of the wedge shape needs to be partly changed to change the projection position, thereby pretendedly addressing the change in the imaging position of a virtual image.

However, in the HUD according to an embodiment of the present invention that uses the windshield glass according to an embodiment of the present invention and that uses p-polarized light as described above, the use of a wedge-shaped glass is not necessary, and the thickness of the glass can be made uniform in the linearly polarized light reflection film. Therefore, a projection system in which the imaging position of a virtual image is changeable can be suitably employed.

Next, the HUD will be more specifically described with reference to FIG. 5 and FIG. 6.

Figure 5:
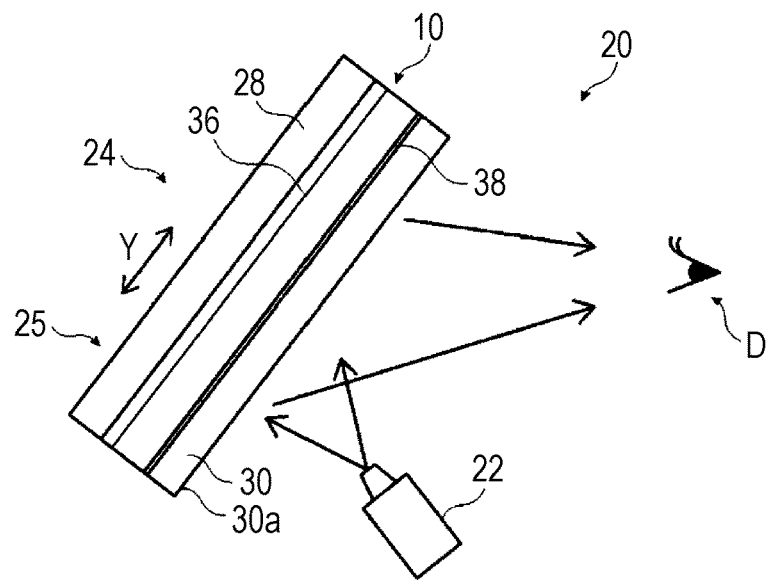
FIG. 5 is a schematic view illustrating an example of a head-up display having the linearly polarized light reflection film according to an embodiment of the present invention.

FIG. 5 is a schematic view illustrating an example of a head-up display having the linearly polarized light reflection film according to an embodiment of the present invention. FIG. 6 is a schematic view illustrating an example of a windshield glass having the linearly polarized light reflection film according to an embodiment of the present invention.

The HUD 20 has a projector 22 and a windshield glass 24, and is used for, for example, vehicles such as passenger cars. Each of the constituent elements of the HUD20 has been described above.

Figure 6:
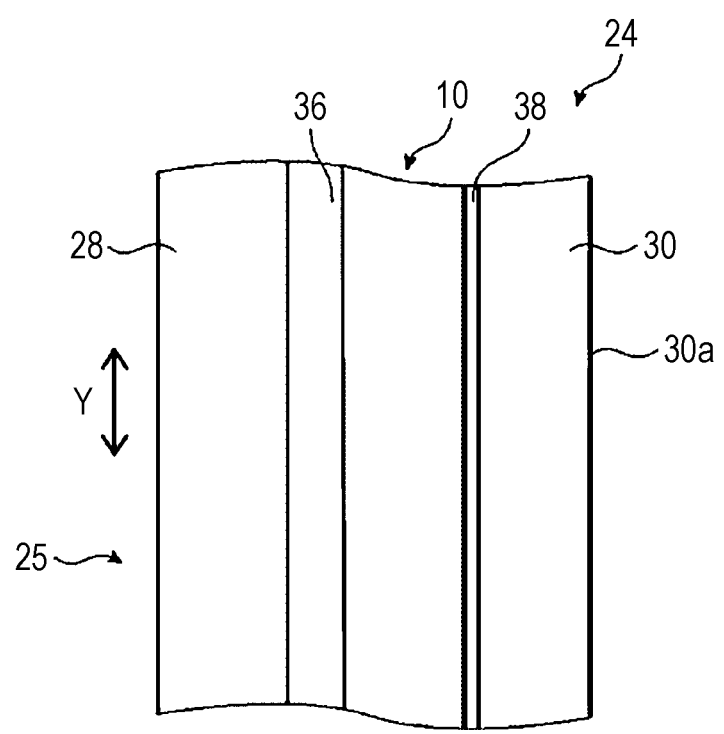
FIG. 6 is a schematic view illustrating an example of a windshield glass having the linearly polarized light reflection film according to an embodiment of the present invention.

In the HUD 20, as conceptually illustrated in FIG. 6, the windshield glass 24 has a first glass plate 28 serving as the first glass plate, a second glass plate 30 serving as the second glass plate, a linearly polarized light reflection film 10, an intermediate film 36, and an adhesive layer 38.

The linearly polarized light reflection film 10 is the linearly polarized light reflection film 10 illustrated in FIG. 1 and has a selectively reflecting layer in which optically anisotropic layers and isotropic layers are alternately laminated. In the HUD 20, the windshield glass 24 and the linearly polarized light reflection film 10 illustrated in FIG. 2 are disposed so that the up and down direction Y of the windshield glass 24 matches the axis P of the linearly polarized light reflection film 10. In the windshield glass (HUD) according to an embodiment of the present invention, the linearly polarized light reflection film may have a support.

The up and down direction Y of the windshield glass 24 is a direction corresponding to the top and bottom direction of a vehicle or the like including the windshield glass 24 disposed therein, and is defined as a direction in which the ground side is the lower side and the side opposite to the ground side is the upper side. In the case where the windshield glass 24 is disposed in a vehicle or the like, the windshield glass 24 is sometimes disposed in an inclined manner for the sake of convenience of structure or design. In this case, the up and down direction Y corresponds to a direction along a surface 25 of the windshield glass 24. The surface 25 is an outer surface of the vehicle.

The projector 22 has been described above. The projector 22 may be a publicly known projector used for HUDs as long as the projector can emit p-polarized projection light that carries a screen image to be displayed. The projector 22 is preferably a projector in which the imaging distance of a virtual image, that is, the imaging position of a virtual image is changeable.

In the HUD 20, the projector 22 irradiates the windshield glass 24 (second glass plate 30) with p-polarized projection light. When the projection light with which the windshield glass 24 is irradiated by the projector 22 is p-polarized light, the reflection of the projection light by the second glass plate 30 and the first glass plate 28 of the windshield glass 24 can be considerably reduced, which can suppress inconvenience such as observation of double images.

The projector 22 preferably irradiates the windshield glass 24 with p-polarized projection light at a Brewster's angle. This eliminates the reflection of projection light at the second glass plate 30 and the first glass plate 28, which allows display of a clearer screen image.

The windshield glass 24 is a so-called laminated glass and has the intermediate film 36, the linearly polarized light reflection film 10, and the adhesive layer 38 between the first glass plate 28 and the second glass plate 30.

Projection light emitted from the projector 22 enters the second glass plate 30 through the surface 30a of the second glass plate 30. The linearly polarized light reflection film 10 reflects p-polarized light, and the axis P illustrated in FIG. 2, that is, the direction of linearly polarized light reflected by the linearly polarized light reflection film 10 is set so that the linearly polarized light reflection film reflects p-polarized light as described above.

As described above, the linearly polarized light reflection film 10 has the first reflection peak, the second reflection peak, and the third reflection peak as reflection characteristics.

The linearly polarized light reflection film 10 is bonded to the first glass plate 28 using the intermediate film 36 and to the second glass plate 30 using the adhesive layer 38 so as to be sandwiched between the first glass plate 28 and the second glass plate 30.

In the present invention, preferably, the first glass plate 28 and second glass plate 30 of the windshield glass 24 are basically disposed in parallel.

The first glass plate 28 and the second glass plate 30 are each a publicly known glass (glass plate) used for windshields of vehicles or the like. Therefore, for example, the material, the thickness, and the shape may be the same as those of publicly known glasses used for windshields. The first glass plate 28 and the second glass plate 30 illustrated in FIG. 6 each have a plate-like shape, but the shape is not limited thereto. They may partly have a curved surface or may entirely have a curved surface.

The intermediate film 36 is provided to prevent the glass from flying into a car and scattering inside the car when an accident occurs. The intermediate film 36 is also provided to bond the linearly polarized light reflection film 10 and the first glass plate 28 to each other. The intermediate film 36 may be a publicly known intermediate film (intermediate layer) used for windshields formed of laminated glass. Examples of the material for the intermediate film 36 include polyvinyl butyral (PVB), ethylene-vinyl acetate copolymer, chlorine-containing resin, and polyurethane.

The thickness of the intermediate film 36 is not limited, and may be set to the same thickness as publicly known intermediate films for windshield glasses in accordance with, for example, the material for the intermediate film 36.

The adhesive layer 38 is a layer formed of, for example, a coating-type adhesive agent. The linearly polarized light reflection film 10 is bonded to the second glass plate 30 using the adhesive layer 38. In the windshield glass according to an embodiment of the present invention, the linearly polarized light reflection film 10 may be bonded to the second glass plate 30 using an intermediate film instead of the adhesive layer 38. When the linearly polarized light reflection film 10 is smaller than the intermediate film 36 used to bond the first glass plate 28 and the linearly polarized light reflection film 10, the linearly polarized light reflection film 10 may be bonded to the second glass plate 30 using the intermediate film 36.

The adhesive layer 38 is not limited, and may be formed of publicly known various coating-type adhesive agents as long as transparency required as the windshield glass 24 can be ensured and the linearly polarized light reflection film 10 and the glass can be bonded to each other with a necessary adhesive strength. The adhesive layer 38 may be formed of the same material as the intermediate film 36, such as PVB. Instead, the adhesive layer 38 may be formed of, for example, an acrylate-based adhesive agent. The adhesive layer 38 may be formed of the same material as the above-described adhesive layer as described below.

The adhesive layer 38 may be formed of an adhesive agent in the same manner as the above-described adhesive layer.

From the viewpoint of the type of setting, adhesive agents are classified into hot-melt adhesive agents, thermosetting adhesive agents, photosetting adhesive agents, reaction-setting adhesive agents, and pressure-sensitive adhesive agents requiring no setting. Examples of usable materials for these adhesive agents include compounds such as acrylate compounds, urethane compounds, urethane acrylate compounds, epoxy compounds, epoxy acrylate compounds, polyolefin compounds, modified olefin compounds, polypropylene compounds, ethylene vinyl alcohol compounds, vinyl chloride compounds, chloroprene rubber compounds, cyanoacrylate compounds, polyamide compounds, polyimide compounds, polystyrene compounds, and polyvinyl butyral compounds.

From the viewpoint of workability and productivity, the type of setting is preferably photosetting. From the viewpoint of optical transparency and heat resistance, the material for use is preferably, for example, an acrylate compound, a urethane acrylate compound, or an epoxy acrylate compound.

The adhesive layer 38 may be formed using a high-transparency adhesive transfer tape (OCA tape). The high-transparency adhesive transfer tape may be a commercially available tape for screen image display devices, in particular, a commercially available tape for a surface of a screen image display unit of a screen image display device. Examples of the commercially available tape include an adhesive sheet (e.g., PD-S1) manufactured by PANAC Co., Ltd. and an MHM adhesive sheet manufactured by Nichieikako Co., Ltd.

The thickness of the adhesive layer 38 is also not limited. Therefore, it is sufficient that the thickness is appropriately set in accordance with the material for the adhesive layer 38 so as to provide a sufficient bonding strength.

Herein, if the adhesive layer 38 is excessively thick, the linearly polarized light reflection film 10 sometimes cannot be bonded to the first glass plate 28 or the second glass plate 30 while the planarity is sufficiently maintained. In consideration of this point, the thickness of the adhesive layer 38 is preferably 0.1 to 800 µm and more preferably 0.5 to 400 µm.

For the windshield glass 24, the adhesive layer 38 is disposed between the linearly polarized light reflection film 10 and the second glass plate 30, and the linearly polarized light reflection film 10 and the first glass plate 28 are bonded to each other using the intermediate film 36, but the configuration of the windshield glass 24 is not limited thereto. That is, an adhesive layer may be disposed between the linearly polarized light reflection film 10 and the first glass plate 28, and an intermediate film may be disposed between the linearly polarized light reflection film 10 and the second glass plate 30.

The windshield glass 24 may have a configuration in which the windshield glass 24 does not have the intermediate film 36, and the linearly polarized light reflection film 10 and the first glass plate 28 may be bonded to each other using the adhesive layer 38 and the linearly polarized light reflection film 10 and the second glass plate 30 may be bonded to each other using the adhesive layer 38.

In the HUD 20, the windshield glass 24 has a configuration in which the linearly polarized light reflection film 10 is disposed between the first glass plate 28 and the second glass plate 30, the linearly polarized light reflection film 10 is bonded to the second glass plate 30 using the adhesive layer 38, and the linearly polarized light reflection film 10 is bonded to the first glass plate 28 using the intermediate film 36.

As illustrated in FIG. 5, in the HUD 20, an observer of a screen image, that is, a driver D observes a virtual image formed through projection by the projector 22 and reflection by the windshield glass 24.

In a typical HUD, a projection image of a projector is reflected by a glass of a windshield, and the resulting reflected light is observed. Herein, a typical windshield is a laminated glass and has two glasses on the inner surface side and the outer surface side. Therefore, such an HUD poses a problem in that a driver observes double images through reflected light from the two glasses.

To address this problem, in a typical HUD, the section of the windshield (intermediate film) has a wedge shape so that the reflection at the inner-side glass and the reflection at the outer-side glass overlap each other, thus preventing observation of double images.

However, as described above, in a wedge-shaped windshield, if the imaging distance of a virtual image is changed to handle the difference in line of sight of a driver between normal driving with a short line of sight and high-speed driving with a long line of sight, the angle of the wedge of the windshield becomes inappropriate. Consequently, the driver observes a double image.

In contrast, in the HUD 20 according to an embodiment of the present invention, the projector 22 projects p-polarized light, the windshield glass 24 has the linearly polarized light reflection film 10 that reflects the p-polarized light between the first glass plate 28 and the second glass plate 30, and the driver D observes the light reflected by the linearly polarized light reflection film 10. In such a configuration, the reflection of projection light of the projector 22 at the linearly polarized light reflection film 10 is basically dominant, and thus formation of double images is basically less likely to occur.

Therefore, in the HUD 20 that uses the linearly polarized light reflection film 10 according to an embodiment of the present invention for the windshield glass 24, the section of the windshield glass 24 (intermediate film 36) does not necessarily have a wedge shape. Therefore, even if the imaging distance of a virtual image is changed, double images are not formed.

The present invention basically has the above configuration. Although the linearly polarized light reflection film, the windshield glass, and the head-up display system (HUD) according to embodiments of the present invention have been described in detail above, the present invention is not limited to the above embodiments, and various improvements or changes may be made without departing from the spirit of the present invention.

EXAMPLES

Hereafter, the features of the present invention will be further specifically described based on Examples. Materials, reagents, amounts and percentages of substances, operations, and the like used in Examples below can be appropriately changed without departing from the spirit of the present invention. Therefore, the scope of the present invention is not limited to Examples below.

Example 1

Production of Linearly Polarized Light Reflection Film

A linearly polarized light reflection film (selectively reflecting layer) was produced as follows by a method described in JP1997-506837A (JP-H09-506837A).

In a standard polyester resin synthesis kettle, 2,6-polyethylene naphthalate (PEN) and a copolyester (coPEN) of naphthalate 70/terephthalate 30 were synthesized using ethylene glycol as a diol. Monolayer films of PEN and coPEN were extruded, then stretched at a stretching ratio of 5:1 at about 150° C., and heat-treated at about 230° C. for 30 seconds. It was confirmed that the refractive index of PEN associated with the slow axis (alignment axis) was about 1.86, the refractive index associated with the transverse axis was 1.64, and the refractive index of the coPEN film was about 1.64.

It was then confirmed that by adjusting the stretching ratio, the refractive index of PEN associated with the slow axis was set to about 1.71, the refractive index associated with the transverse axis was set to 1.64, and the refractive index of the coPEN film was set to about 1.64. That is, the difference Δn between the refractive index in the slow axis direction of the optically anisotropic layer and the refractive index of the isotropic layer is 0.07.

Subsequently, PEN and coPEN were simultaneously extruded using a 25-slot feed block equipped with a standard extrusion die to form a layer having 16 alternating layers of PEN and coPEN having film thicknesses shown in (1) in Table 1 below. Furthermore, by repeating the same procedure, 16 alternating layers of PEN and coPEN having film thicknesses shown in (2) to (6) in Table 1 were sequentially formed to produce a laminated body having 96 layers in total.

TABLE 1

|  |  | (1) | (2) | (3) | (4) | (5) | (6) |
|---|---|---|---|---|---|---|---|
| PEN | Film thickness | 65.8 nm | 80.4 nm | 95 nm | 102.3 nm | 109.6 nm | 117.0 nm |
| coPEN | Film thickness | 68.6 nm | 83.8 nm | 99.1 nm | 106.7 nm | 114.3 nm | 122.0 nm |
| Number of layers | | 16 | 16 | 16 | 16 | 16 | 16 |

Subsequently, the stretched laminated body was heat-treated at about 230° C. for 30 seconds in an air oven to produce a linearly polarized light reflection film. The produced linearly polarized light reflection film had a thickness of about 10 μm. When the reflection spectrum of the linearly polarized light reflection film was measured with a spectrophotometer (manufactured by JASCO Corporation, V-670), a reflection spectrum having reflection peaks at 450 nm, 550 nm, 650 nm, 700 nm, 750 nm, and 800 nm was obtained.

Examples 2 to 4 and Comparative Examples 1 to 3

Linearly polarized light reflection films having reflection peaks shown in Table 2 below were produced by appropriately changing the refractive indices in the slow axis direction of the PEN layers, that is, by appropriately changing the difference Δn between the refractive indices in the slow axis direction of the optically anisotropic layers and the refractive indices of the isotropic layers, and the film thicknesses and the number of layers of the PEN layers (optically anisotropic layers) and the coPEN layers (slow axis direction).

Table 2 below shows, for example, the wavelengths of the reflection peaks, the reflectivities, the wavelength widths, and the presence or absence of contact between the light reflection layers in each of Examples and Comparative Examples. In Table 2, when a plurality of third reflection peaks are present, the reflection peaks are differentiated as 3A, 3B, 3C, and 3D.

In Examples 1 to 3, the intensity ratios between the first reflection peak, the second reflection peak, and the third reflection peak are each 80% or more and 120% or less. In contrast, in Example 4, the intensity ratio between the first reflection peak and the second reflection peak is 150%, and the intensity ratio between the first reflection peak and the third reflection peak is 125%.

The reflectivity and the wavelength width at the reflection peaks in each of Examples and Comparative Examples were measured as follows.

The produced linearly polarized light reflection film was bonded to a front surface of a glass plate, and a black PET film (light absorber) was bonded to a back surface of the glass plate.

Using a spectrophotometer (manufactured by JASCO Corporation, V-670), p-polarized light and s-polarized light were each caused to enter the surface of the linearly polarized light reflection film at 5° with respect to the direction normal to the surface, and the reflection spectrum at 400 nm to 1000 nm was measured. The average (average reflection spectrum) of the measured reflection spectrum of p-polarized light and the measured reflection spectrum of s-polarized light was determined.

The average of the reflectivity at which p-polarized light is incident and the reflectivity at which s-polarized light is incident has the same meaning as the reflectivity at which unpolarized light (natural light) is incident. That is, the average of the reflection spectrum of p-polarized light and the reflection spectrum of s-polarized light has the same meaning as the reflection spectrum obtained when natural light is incident.

From the calculated averages of the reflection spectra of p-polarized light and s-polarized light, the following was calculated.

A reflection peak (maximum value) in the wavelength range of 430 nm to 500 nm was extracted as a first reflection peak, and the reflectivity and the wavelength width of the first reflection peak were calculated.

A reflection peak (maximum value) in the wavelength range of 530 nm to 600 nm was extracted as a second reflection peak, and the reflectivity and the wavelength width were calculated.

A reflection peak (maximum value) in the wavelength range of 600 nm to 800 nm was extracted as a third reflection peak, and the number of peaks, the reflectivity, and the wavelength width of the third reflection peak were calculated.

The wavelength width of the first reflection peak is a width of a region in which the reflectivity is higher than the average of the maximum reflectivity and the minimum reflectivity in the wavelength range of 430 nm to 500 nm.

The wavelength width of the second reflection peak is a width of a region in which the reflectivity is higher than the average of the maximum reflectivity and the minimum reflectivity in the wavelength range of 530 nm to 600 nm.

The wavelength width of the third reflection peak is a width of a region in which the reflectivity is higher than the average of the maximum reflectivity and the minimum reflectivity in the wavelength range of 600 nm to 800 nm.

In Comparative Example 2, the first reflection peak and the second reflection peak overlap each other, and the wavelength width extends from the wavelength region of 430 nm to 500 nm to the wavelength region of 530 nm to 600 nm.

TABLE 2

| | Difference in refractive index Δn | First reflection peak | | | Second reflection peak | | | Third reflection peak 3A | |
|---|---|---|---|---|---|---|---|---|---|
| | | Wavelength nm | Reflectivity % | Wavelength width nm | Wavelength nm | Reflectivity % | Wavelength width nm | Wavelength nm | Reflectivity % |
| Example 1 | 0.07 | 450 | 15 | 56 | 550 | 15 | 65 | 650 | 15 |
| Example 2 | 0.12 | 450 | 15 | 60 | 550 | 15 | 80 | 650 | 15 |
| Example 3 | 0.17 | 450 | 15 | 86 | 550 | 15 | 40 | 700 | 15 |
| Example 4 | 0.07 | 450 | 12 | 65 | 550 | 18 | 63 | 650 | 15 |
| Comparative Example 1 | 0.17 | 420 | 15 | 84 | 520 | 15 | 40 | 670 | 15 |
| Comparative Example 2 | 0.17 | 450 | 8 | 150 | 550 | 8 | 150 | 700 | 8 |
| Comparative Example 3 | 0.17 | 450 | 15 | 86 | 550 | 15 | 40 | 650 | 15 |

| | Third reflection peak | | | | | | | Wavelength width nm | State between light reflection layers |
|---|---|---|---|---|---|---|---|---|---|
| | 3B | | 3C | | 3D | | Number of peaks | | |
| | Wavelength nm | Reflectivity % | Wavelength nm | Reflectivity % | Wavelength nm | Reflectivity % | | | |
| Example 1 | 700 | 15 | 750 | 15 | 800 | 15 | 4 | — | contact |
| Example 2 | 700 | 15 | 750 | 15 | | | 3 | — | contact |
| Example 3 | | | | | | | 1 | 150 | contact |
| Example 4 | 700 | 15 | 750 | 15 | 800 | 15 | 4 | — | contact |
| Comparative Example 1 | | | | | | | 1 | 150 | contact |
| Comparative Example 2 | | | | | | | 1 | 180 | contact |
| Comparative Example 3 | | | | | | | 1 | 80 | contact |

Production of Windshield Glass

A windshield glass having each of the produced linearly polarized light reflection films was produced as follows.

A glass plate having a length of 120 mm, a width of 100 mm, and a thickness of 2 mm (manufactured by Central Glass Co., Ltd., FL2, visible light transmittance 90%) was provided.

A PVB film having a thickness of 0.38 mm, cut to the same size as that of the glass plate, and manufactured by Sekisui Chemical Co., Ltd. was disposed on the glass plate as an intermediate film. A sheet-shaped linearly polarized light reflection film cut to a size having a length of 110 mm and a width of 90 mm was disposed on the intermediate film so that the slow axis direction was in parallel with the lengthwise direction.

A glass plate having a length of 120 mm, a width of 100 mm, and a thickness of 2 mm (manufactured by Central Glass Co., Ltd., FL2, visible light transmittance 90%) was disposed on the linearly polarized light reflection film.

This laminated body was held at 90° C. and 10 kPa (0.1 atmospheres) for one hour and then heated in an autoclave (manufactured by KURIHARA SEISAKUSHO Co., Ltd.) at 115° C. and 1.3 MPa (13 atmospheres) for 20 minutes to remove air bubbles. Thus, a windshield glass was obtained.

Evaluation of Visible Light Transmittance

Natural light was caused to enter a surface of the glass opposite to the surface in contact with the film at 0° with respect to the direction normal to the glass, and the transmittance spectrum was measured with a spectrophotometer (manufactured by JASCO Corporation, V-670). In conformity with JIS R 3106, the transmittance was calculated by multiplying the transmittance in the wavelength range of 380 to 780 nm at intervals of 10 nm by a coefficient based on luminosity and an emission spectrum of an A light source.

The transmittance was used for evaluation. The transmittance was evaluated on the basis of the following evaluation criteria.

Evaluation Criteria of Transmittance
  A: 80% or more (when the laminated glass is formed of green glass, the transmittance is 70% or more)
  B: less than 80% (when the laminated glass is formed of green glass, the transmittance is less than 70%, which does not satisfy the legal regulations)

Evaluation of p-Polarized Light Reflectivity

Here, p-polarized light was caused to enter a surface of the glass in contact with the film at 65° with respect to the direction normal to the glass. The reflectivity spectrum of the regularly reflected light (at an angle of 65° symmetrically with respect to the direction normal to the incidence plane) was measured using a spectrophotometer (manufactured by JASCO Corporation, V-670). The long-side direction (lengthwise direction) of the linearly polarized light reflection film was made parallel with the transmission axis of p-polarized light entering the spectrophotometer.

In conformity with JIS R 3106, a projection image reflectivity was calculated by multiplying the reflectivity in the wavelength range of 380 to 780 nm at intervals of 10 nm by a coefficient based on luminosity and an emission spectrum of a D65 light source. The projection image reflectivity was evaluated as brightness. The brightness was evaluated on the basis of the following criteria.

Evaluation Criteria of p-Polarized Light Reflectivity
  A: 25% or more (a screen image is visible in a p-polarized light reflection system of an HUD, and double images are less visible)
  B: 20% or more and less than 25% (a screen image is visible in a p-polarized light reflection system of an HUD, and double images are visible)

C: less than 20% (a screen image is not clearly visible in a p-polarized light reflection system of an HUD, and double images are well visible)

Evaluation of Reflection Tint

The reflectivity of natural light at incidence angles of 5° and 60° was measured by the same method as that for the transmittance, and a* and b* of reflection tint were calculated from the obtained spectrum.

Evaluation criteria of reflection tint

AA: |a*|≤3 and |b*|≤3 (when a white image is projected, the white image looks white)

A: |a*|≤5 and |b*|≤5 (excluding those corresponding to AA) (when a white image is projected, the white image looks almost white)

B: either of a* or b* is large
|a*|≤7 and |b*|≤7 (excluding those corresponding to AA or A) (when a white image is projected, the white image looks slightly tinted)

C: either of a* or b* is large
|a*|≤9 and |b*|≤9 (excluding those corresponding to AA, A, or B) (when a white image is projected, the white image looks slightly tinted)

D: both a* and b* are large
9≤|a*| or 9≤|b*| (when a white image is projected, the white image looks like another color)

Table 3 shows the results.

TABLE 3

|  | Evaluation | | | |
| --- | --- | --- | --- | --- |
|  | Transmittance | p-polarized light reflectivity | Reflection tint 5° | Reflection tint 60° |
| Example 1 | A | A | A | AA |
| Example 2 | A | A | A | A |
| Example 3 | A | A | A | B |
| Example 4 | A | A | B | A |
| Comparative Example 1 | A | A | B | D |
| Comparative Example 2 | A | C | A | A |
| Comparative Example 3 | A | B | A | D |

Table 3 shows that better results are obtained for transmittance, p-polarized light reflectivity (brightness), and reflection tint in Examples than in Comparative Examples.

The comparison of Examples 1 to 3 shows that the difference Δn between the refractive index in the slow axis direction of the optically anisotropic layer and the refractive index of the isotropic layer is preferably 0.05 to 0.14 and more preferably 0.05 to 0.10.

The comparison between Example 1 and Example 4 shows that the intensity ratio between the reflection peaks is preferably 80% or more and 120% or less.

From the above results, the advantageous effects of the present invention are obvious.

The present invention is suitably applicable to, for example, head-up display systems (HUDs) for vehicles.

REFERENCE SIGNS LIST 10 linearly polarized light reflection film
11 first laminated portion
11a, 12a, 13a optically anisotropic layer
11b, 12b, 13b isotropic layer
12 second laminated portion
13 third laminated portion
20 head-up display system (HUD)
22 projector
24 windshield glass
25, 30a surface
28 first glass plate
30 second glass plate
36 intermediate film
38 adhesive layer
D driver
P axis
Y up and down direction

What is claimed is:

1. A linearly polarized light reflection film comprising:
a selectively reflecting layer in which an optically anisotropic layer and an isotropic layer are laminated,
wherein a difference between a refractive index in a slow axis direction of the optically anisotropic layer and a refractive index of the isotropic layer is 0.03 to 0.2, and
the selectively reflecting layer satisfies all of items below:
Item (i) the selectively reflecting layer has at least one first reflection peak having a reflection center wavelength of 430 nm or more and less than 500 nm and has a natural light reflectivity of 10% or more and 20% or less at the first reflection peak,
Item (ii) the selectively reflecting layer has at least one second reflection peak having a reflection center wavelength of 530 nm or more and less than 600 nm and has a natural light reflectivity of 10% or more and 20% or less at the second reflection peak, and
Item (iii) the selectively reflecting layer has a third reflection peak having a reflection center wavelength of 600 nm or more and 800 nm or less, and the third reflection peak satisfies any of conditions below,
  (a) two or more reflection peaks are present with a natural light reflectivity of 10% or more and 20% or less, and
  (b) one reflection peak is present with a natural light reflectivity of 10% or more and 20% or less, and a region having a reflectivity higher than an average of a maximum reflectivity and a minimum reflectivity at 600 nm to 800 nm has a wavelength width of 120 nm or more.

2. The linearly polarized light reflection film according to claim 1,
wherein the third reflection peak of the Item (iii) of the selectively reflecting layer satisfies only the (a).

3. The linearly polarized light reflection film according to claim 1,
wherein an intensity ratio between the first reflection peak and the second reflection peak is 80% or more and 120% or less,
an intensity ratio between the first reflection peak and the third reflection peak is 80% or more and 120% or less, and
an intensity ratio between the second reflection peak and the third reflection peak is 80% or more and 120% or less.

4. The linearly polarized light reflection film according to claim 1,
wherein at the first reflection peak, a region having a reflectivity higher than an average of a maximum reflectivity and a minimum reflectivity at 430 nm to 500 nm has a wavelength width of 20 nm or more and 95 nm or less, and
at the second reflection peak, a region having a reflectivity higher than an average of a maximum reflectivity and a minimum reflectivity at 530 nm to 600 nm has a wavelength width of 20 nm or more and 95 nm or less.

5. The linearly polarized light reflection film according to claim 1,
wherein the selectively reflecting layer is constituted by two or more light reflection layers having different selective reflection wavelengths, and
light reflection layers having any of the first reflection peak, the second reflection peak, and the third reflection peak are in contact with each other.

6. The linearly polarized light reflection film according to claim 1,
wherein a difference between a refractive index in a slow axis direction of the optically anisotropic layer and a refractive index of the isotropic layer is 0.05 to 0.14.

7. The linearly polarized light reflection film according to claim 1,
wherein a difference between a refractive index in a slow axis direction of the optically anisotropic layer and a refractive index of the isotropic layer is 0.05 to 0.10.

8. A windshield glass comprising:
the linearly polarized light reflection film according to claim 1 between a first glass plate and a second glass plate.

9. A head-up display system comprising:
the windshield glass according to claim 8; and
a projector that emits p-polarized projection image light to the windshield glass.

10. The linearly polarized light reflection film according to claim 2,
wherein an intensity ratio between the first reflection peak and the second reflection peak is 80% or more and 120% or less,
an intensity ratio between the first reflection peak and the third reflection peak is 80% or more and 120% or less, and
an intensity ratio between the second reflection peak and the third reflection peak is 80% or more and 120% or less.

11. The linearly polarized light reflection film according to claim 2,
wherein at the first reflection peak, a region having a reflectivity higher than an average of a maximum reflectivity and a minimum reflectivity at 430 nm to 500 nm has a wavelength width of 20 nm or more and 95 nm or less, and
at the second reflection peak, a region having a reflectivity higher than an average of a maximum reflectivity and a minimum reflectivity at 530 nm to 600 nm has a wavelength width of 20 nm or more and 95 nm or less.

12. The linearly polarized light reflection film according to claim 2,
wherein the selectively reflecting layer is constituted by two or more light reflection layers having different selective reflection wavelengths, and
light reflection layers having any of the first reflection peak, the second reflection peak, and the third reflection peak are in contact with each other.

13. The linearly polarized light reflection film according to claim 2,
wherein a difference between a refractive index in a slow axis direction of the optically anisotropic layer and a refractive index of the isotropic layer is 0.05 to 0.14.

14. The linearly polarized light reflection film according to claim 2,
wherein a difference between a refractive index in a slow axis direction of the optically anisotropic layer and a refractive index of the isotropic layer is 0.05 to 0.10.

15. A windshield glass comprising:
the linearly polarized light reflection film according to claim 2 between a first glass plate and a second glass plate.

16. A head-up display system comprising:
the windshield glass according to claim 15; and
a projector that emits p-polarized projection image light to the windshield glass.

17. The linearly polarized light reflection film according to claim 3,
wherein at the first reflection peak, a region having a reflectivity higher than an average of a maximum reflectivity and a minimum reflectivity at 430 nm to 500 nm has a wavelength width of 20 nm or more and 95 nm or less, and
at the second reflection peak, a region having a reflectivity higher than an average of a maximum reflectivity and a minimum reflectivity at 530 nm to 600 nm has a wavelength width of 20 nm or more and 95 nm or less.

18. The linearly polarized light reflection film according to claim 3,
wherein the selectively reflecting layer is constituted by two or more light reflection layers having different selective reflection wavelengths, and
light reflection layers having any of the first reflection peak, the second reflection peak, and the third reflection peak are in contact with each other.

19. The linearly polarized light reflection film according to claim 1,
wherein a minimum value of a natural light reflectivity between the first reflection peak and the second reflection peak and a minimum value of a natural light reflectivity between the second reflection peak and the third reflection peak are each 15% or less.

20. The linearly polarized light reflection film according to claim 1,
wherein the selective reflection layer is formed by alternately laminating a plurality of the optically anisotropic layers and a plurality of the isotropic layers.

* * * * *